(12) United States Patent
Khayrallah

(10) Patent No.: US 7,769,080 B2
(45) Date of Patent: Aug. 3, 2010

(54) METHOD FOR COVARIANCE MATRIX UPDATE

(75) Inventor: Ali S. Khayrallah, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1000 days.

(21) Appl. No.: 11/470,676

(22) Filed: Sep. 7, 2006

(65) Prior Publication Data

US 2008/0063033 A1    Mar. 13, 2008

(51) Int. Cl.
    *H04B 1/00* (2006.01)
(52) U.S. Cl. ......................... 375/148; 375/150
(58) Field of Classification Search ............. 375/148, 375/150, 147, 139, 130
    See application file for complete search history.

(56) References Cited

U.S. PATENT DOCUMENTS

| 6,363,104 | B1 | 3/2002 | Bottomley |
| 6,738,682 | B1* | 5/2004 | Pasadyn ................ 700/100 |
| 6,947,715 | B2 | 9/2005 | Kolze |
| 2004/0139137 | A1 | 7/2004 | Mailaender et al. |
| 2004/0219899 | A1* | 11/2004 | Ho et al. ................ 455/273 |
| 2005/0175131 | A1 | 8/2005 | Kansanen et al. |
| 2005/0201447 | A1 | 9/2005 | Cairns et al. |
| 2005/0215218 | A1* | 9/2005 | Bottomley et al. ....... 455/226.1 |
| 2006/0008018 | A1 | 1/2006 | Kolze |
| 2006/0115030 | A1* | 6/2006 | Erving et al. ............ 375/348 |
| 2006/0251156 | A1* | 11/2006 | Grant et al. .............. 375/148 |

FOREIGN PATENT DOCUMENTS

| EP | 1357714 | 10/2003 |
| WO | WO 2005/096517 | 10/2005 |

OTHER PUBLICATIONS

Wang et al., "Generalized RAKE Reception for Cancelling Interference from Multiple Base Stations," Vehicular Technology Conference, Sep. 24, 2000, pp. 2333-2339, vol. 5, XP-10522193.
Bottomley, G.E., Ottosson, T., and Wang, Yi-Pin Eric., "A Generalized RAKE Receiver for Interference Suppression." *IEEE Journal On Selected Areas In Communications*, Aug. 2000, vol. 18, No. 8, pp. 1536-1545.
Seeger, M., "Low rank updates for the Cholesky decomposition," Department of EECS, UC Berkeley, 2005, pp. 1-10.

* cited by examiner

*Primary Examiner*—David C Payne
*Assistant Examiner*—Brian J Stevens
(74) *Attorney, Agent, or Firm*—Coates & Bennett, P.L.L.C.

(57) ABSTRACT

A method and apparatus for updating a square root matrix of a covariance matrix when sample sets are added to or removed from a received signal. When a sample set is added to the received signal, a processor augments the square root matrix to generate an updated square root matrix for future processing. When a sample set is no longer present in the received signal, the processor reduces the square root matrix to generate the updated square root matrix.

27 Claims, 4 Drawing Sheets

METHOD FOR COVARIANCE MATRIX UPDATE

BACKGROUND

The present invention relates generally to multi-signal receivers, and more particularly to updating processing parameters for multi-signal receivers.

Conventional wireless receivers often use noise and/or data covariance information in the form of a covariance matrix to suppress interference between multiple received signals, i.e., multiple sample sets of a single transmitted signal, multiple different signals, or any combination thereof. Examples of interference suppressing receivers include chip equalizers, RAKE receivers, Generalized RAKE (GRAKE) receivers, single-input multiple-output receivers, multiple-input multiple-output receivers, etc.

As well understood in the art, interference suppressing receivers require accurate tracking of the covariances in the covariance matrix. Tracking the covariances often requires highly complex computations due to the large number of received sample sets. These complex computations often restrict a wireless receiver's ability to accurately track and utilize the signal covariances. For example, a wireless receiver may implement a reduced number of covariance updates to reduce receiver complexity. However, this reduction may limit the accuracy of the covariances used to process the received signal. As such, the wireless industry continues to look for ways to improve the operation of interference suppressing receivers.

SUMMARY

The present invention provides a method for updating a square root matrix of a covariance matrix when a sample set is added to or removed from a received signal having two or more sample sets. One exemplary method includes determining impairment correlations and a noise power for an added sample set. The impairment correlations represent cross correlations between the values in the added sample set and the values in the existing sample sets. The method further includes compensating the square root matrix based on the impairment correlations and the noise power. The compensated square root matrix is then augmented by adding a column and a row having a diagonal element derived from the noise power and off-diagonal elements derived from the impairment correlations. A corresponding apparatus is also described.

Another exemplary method includes determining impairment correlations and a noise power for a removed sample set. The impairment correlations represent cross correlations between the values in the removed sample set and the values in the remaining sample sets. The method further includes removing a row and a column corresponding to the removed sample set from a triangular matrix and a diagonal matrix. The triangular and diagonal matrices correspond to the covariance matrix. A reduced square root matrix is then computed based on the reduced triangular matrix, the reduced diagonal matrix, the impairment correlations, and the noise power. A corresponding apparatus is also described.

DETAILED DESCRIPTION

Figure 1:
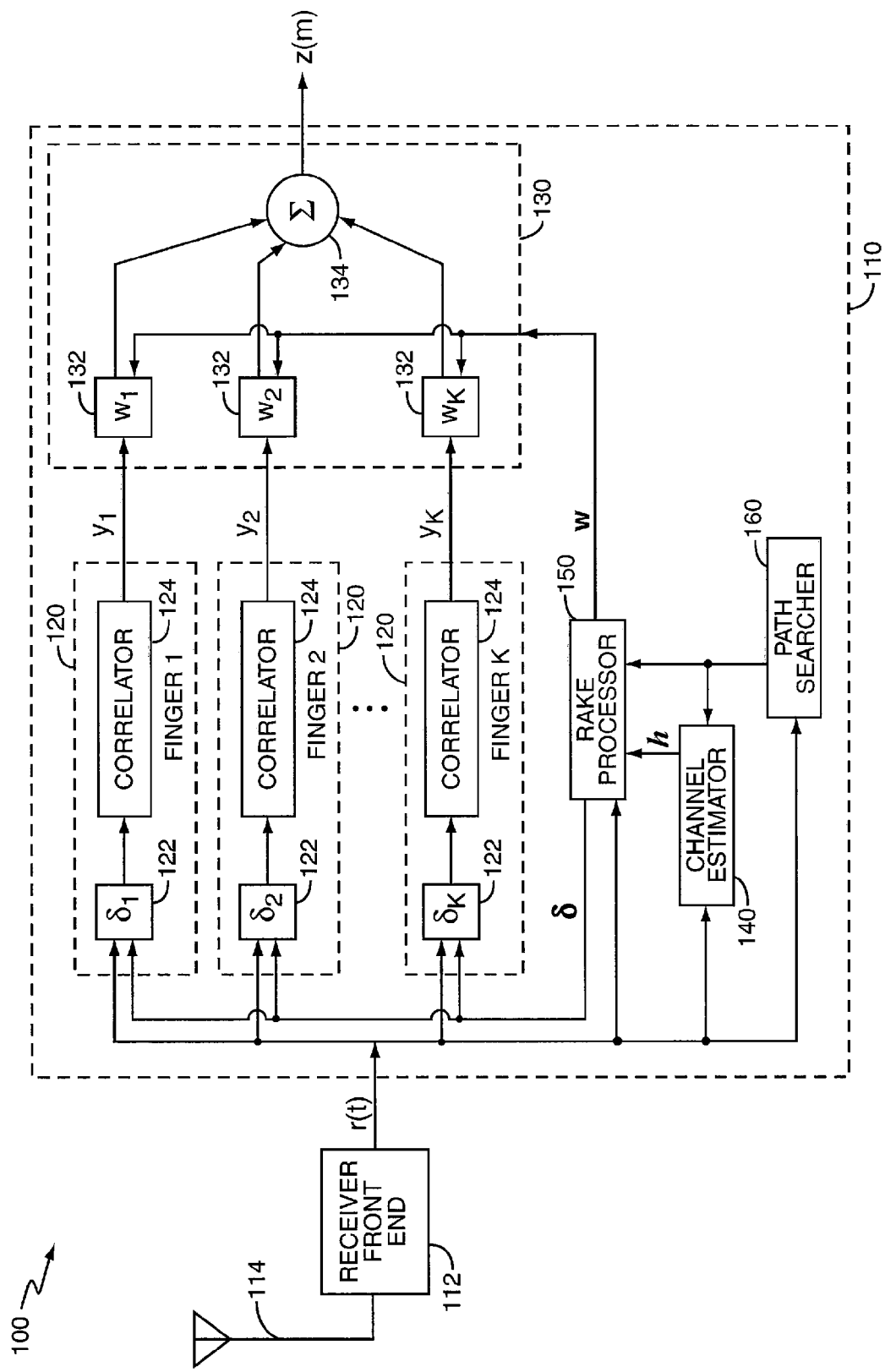
FIG. 1 shows a block diagram of one exemplary wireless receiver comprising a GRAKE receiver.

The present invention provides a method and apparatus for updating covariance matrices when sample sets, i.e., fingers, are added to or removed from a Generalized RAKE (GRAKE) receiver due to added or removed sample sets. FIG. 1 illustrates a block diagram of one exemplary wireless receiver 100 applicable to the present invention. Wireless receiver 100 includes a GRAKE receiver 110, a receiver front end 112, and an antenna 114. Receiver front end 112 outputs received signals r(t) to GRAKE receiver 110. The received signals r(t) comprise streams of sample values obtained from wireless signals received by one or more antennas 114 associated with one or more receiver front ends 112. An exemplary front end 112 may include amplifiers, filters, mixers, digitizers, and/or other electronics as needed to produce the sampled signals r(t) suitable for processing by the GRAKE receiver 110. In some embodiments, r(t) may also include components transmitted from different antennas (not shown).

Each received signal r(t) typically includes one or more sample sets arising from a signal arriving at the receiver 1 00 from different directions and with different time delays. GRAKE receiver 110 combines the sample sets associated with received signal r(t) to generate a symbol estimate z(m) for the $m^{th}$ symbol period. More particularly, GRAKE receiver 110 delays, despreads, weights, and combines the received signal r(t) to estimate z(m), as discussed further below.

GRAKE receiver 110 comprises a plurality of RAKE fingers 120, combiner 130, channel estimator 140, processor 150, and path searcher 160. RAKE fingers 120 process noise and data signals using a delay element 122 and a correlator 124 included in each RAKE finger 120. Delay elements 122 delay the received signal r(t) by an amount defined by processor 150. Correlators 124 correlate the delayed signals with a spreading code to produce a despread value y. The despread values $y=(y_1, y_2, \ldots, y_K)$ from correlators 124 are input to combiner 130.

Combiner 130 includes weighting elements 132 and summer 134. Weighting elements 132 receive and weight the despread signals y from RAKE fingers 120 by weighting coefficients $w=(w_1, w_2, \ldots, w_K)$ determined by processor 150, as described further below. Summer 134 sums the weighted despread signals during each symbol period to form a symbol estimate z(m).

Processor 150 determines the delays $\delta=(\delta_1, \delta_2, \ldots, \delta_K)$ and the corresponding weighting coefficients w in coordination with channel estimator 140 and path searcher 160. As known by those skilled in the art, path searcher 160 identifies candidate delays for RAKE fingers 120. Channel estimator 140 estimates the channel and provides estimated channel coefficients $h=(h_1, h_2, \ldots, h_K)$, also referred to herein as channel estimates h, to processor 150. Based on the channel estimates h and the received signal r(t), processor 150 assigns the appropriate delays $\delta$ and weighting coefficients w to the RAKE fingers 120 and combiner 130, respectively.

In a conventional GRAKE, weighting coefficients w are computed based on noise correlations across the RAKE fingers 120. The weighting coefficients are given by:

$$w = R^{-1}h \quad (1)$$

where $R^{-1}$ is the inverse of a covariance matrix R that represents cross-correlations between RAKE fingers 120. The covariance matrix R can be computed from the despread pilot symbols as is known in the art. The symbol estimate z(m) is then computed as follows:

$$z(m) = w^H y \quad (2)$$

where $w^H$ represents the Hermitian of the weighting coefficient vector. The signal to noise ratio can be estimated by:

$$SNR = w^H h \quad (3)$$

To ensure that GRAKE receiver 110 accurately processes the received signal r(t), processor 150 periodically updates the covariance matrix R. This periodic update may be based on changes to the channel estimates h, the number of RAKE fingers 120, etc. Equation (4) shows one conventional method for generating an updated covariance matrix R' from a current covariance matrix R, an exponential decay factor α, and an error vector e.

$$R' = R + \alpha e e^H \quad (4)$$

The error vector e represents the difference between expected symbol estimates and the current receiver output symbol estimates z(m). The exponential decay factor has a value between 0 and 1.

Each time processor 150 updates covariance matrix R, new combining weights w and a new SNR are computed. As shown by Equation (1), generating new combining weights w first requires computing the inverse of the updated covariance matrix R', which is inherently complex. In addition, while frequently updating the covariance matrix allows GRAKE receiver 110 to more accurately track channel dynamics, increasing the frequency of the updates also increases the complexity of the receiver 110.

The present invention reduces the complexity of the GRAKE receiver 110 by using a square root M of the covariance matrix R to compute the weighting coefficients w. The covariance matrix R is a positive definite matrix. Thus, Cholesky decomposition may be used to compute the matrix M that satisfies the equation:

$$R = MM^H \quad (5)$$

The matrix M may be interpreted as the "square root" of the covariance matrix R. Generally, M is a lower triangular matrix with real positive elements on the diagonal.

The covariance matrix R may also be expressed as a function of related matrices L and D, as shown by:

$$R = LDL^H \quad (6)$$

where L is a lower triangular matrix with 1's on the diagonal and D is a diagonal matrix with positive elements $d_i$. By comparing Equation (5) and Equation (6), a relationship between M, L, and D may be defined. Equation (7) shows the result.

$$M = LD^{1/2} \quad (7)$$

Equations (5), (6), and (7) show how the covariance matrix R relates to a square root matrix M, a triangular matrix L, and a diagonal matrix D.

Because M is a lower triangular matrix, it is less complex to compute the weighting coefficients w using M rather than the covariance matrix R. The weighting coefficients can be computed in two steps. First, an intermediate vector v is computed from M and h. The intermediate vector v is given by:

$$Mv = h \quad (8)$$

After the intermediate vector v is obtained, the weighting coefficients are computed according to:

$$M^H w = v \quad (9)$$

The SNR of the received signal is given by:

$$SNR = v^H v \quad (10)$$

The combined RAKE output is given by:

$$z(m) = w^H y = v^H M^{-1} y \quad (11)$$

Because matrix manipulations are less complex for a triangular matrix, i.e., M, using M in place of the covariance matrix R simplifies conventionally complex GRAKE operations.

Processor 150 may also simplify update operations using the square root matrix M instead of the covariance matrix R. As shown by Equation (4), an updated covariance matrix R' may be computed as a function of R, α, and e. By using the relationships between R, M, L, and D shown in Equations (5)-(7), rules for updating the square root matrix M based on current versions of L, D, and e may be developed, as shown in Equations (12)-(16) below.

First, assume the update L' for triangular matrix L can be computed according to:

$$L' = LK \quad (12)$$

where K is a triangular matrix having the structure defined by:

$$K = \begin{bmatrix} 1 & & & & \\ p_2 \beta_1^* & 1 & & & \\ p_3 \beta_1^* & p_3 \beta_2^* & 1 & & \\ \vdots & \vdots & \vdots & \ddots & \\ p_n \beta_1^* & p_n \beta_2^* & \cdots & p_n \beta_{n-1}^* & 1 \end{bmatrix} \quad (13)$$

The parameters $p_i$ in the vector $p = (p_1, p_2, \ldots, p_n)$ are defined by:

$$p = L^{-1} e \quad (14)$$

The parameters $\beta_i$ for Equation (13) and the diagonal elements $d_i'$ of the updated diagonal matrix D' may be computed according to the following procedure.

$$\begin{aligned} &\gamma_1 = 1/\alpha \\ &\text{for } i = 1:n-1 \\ &\quad a = \gamma_i d_i + |p_i|^2 \\ &\quad \gamma_{i+1} = a/d_i \\ &\quad d_i' = a/\gamma_i \\ &\quad \beta_i = p_i/a \\ &\text{end} \\ &d_n' = d_n + |p_n|^2/\gamma_n \end{aligned} \quad (15)$$

It will be appreciated that this procedure provides one exemplary method for computing the elements of D'. Other alternative methods are also applicable. Once an updated triangular matrix L' and an updated diagonal matrix D' are computed, Equation (16) below may be used to update the square root matrix.

$$M'=L'D'^{1/2}=LKD'^{1/2} \quad (16)$$

The process for updating the square root matrix associated with Equations (12)-(16) may be abbreviated as (M', L', D')=RU(L, D, e, α), where RU stands for root update. The RU process of Equations (12)-(16) represents one exemplary RU process that is used repeatedly during the following discussions as a building block for the present invention. It will be appreciated, however, that other RU processes that update the square root matrix may also apply to the present invention.

The above describes a process for updating the square root matrix M for a constant number of RAKE fingers 120 corresponding to a constant number of sample sets. However, the present invention also allows updating the square root matrix M when the number of RAKE fingers 120 changes. Changing the number of RAKE fingers 120 changes the covariance matrix R. Given a covariance matrix R, an augmented updated covariance matrix R' may be computed when a RAKE finger 120 is added or newly allocated. The augmented covariance matrix R' may be written as:

$$R' = \begin{bmatrix} \sigma^2 & \rho^H \\ \rho & R \end{bmatrix}, \quad (17)$$

where $\sigma^2$ represents the noise power associated with the sample set and ρ represents a vector of the noise covariances of the sample set at the new delay with the sample set at each of the old delays. Based on the relationships between L, D, M, and R, discussed above, an augmented updated square root matrix M' may be computed directly according to Equation 18 as follows:

$$M' = \begin{bmatrix} \sigma & 0 \\ \rho/\sigma & M'' \end{bmatrix}. \quad (18)$$

In Equation (18), M" represents a compensated square root matrix computed according to Equations (12)-(16), where the error vector e is replaced with the vector of noise covariances ρ, and where the exponential decay factor a is replaced with $(-1/\sigma^2)$. The process for compensating the square root matrix associated with Equations (12)-(16) may be abbreviated as:

$$(M'',L'',D'')=RU(L,D,\rho,-1/\sigma^2) \quad (19)$$

When a RAKE finger 120 is removed or de-allocated, the current covariance matrix R may be reduced by one row and one column, as shown below in Equation (20), to generate a reduced updated covariance matrix R'.

$$R = \begin{bmatrix} \sigma^2 & \rho^H \\ \rho & R' \end{bmatrix} \quad (20)$$

The reduced updated square root matrix M' can be computed directly from reduced versions of the triangular matrix L and the diagonal matrix D. A reduced triangular matrix L" may be generated by removing the row and column corresponding to the removed RAKE finger 120 from the triangular matrix L. Similarly, a reduced diagonal matrix D" may be generated by removing the row and column corresponding to the removed RAKE finger 120 from the diagonal matrix D. The reduced updated square root matrix M' may then be computed according to Equations (12)-(16), wherein L is replaced by the reduced triangular matrix L", D is replaced by the reduced diagonal matrix D", the error vector e is replaced with ρ, and where the exponential decay factor α is replaced with $(1/\sigma^2)$. Like with the augmented square root matrix computations, ρ and $\sigma^2$ correspond to a vector of noise covariances and the noise power, respectively, corresponding to the removed RAKE finger 120. The process for computing the reduced updated square root matrix M' associated with Equations (12)-(16) may be abbreviated as:

$$(M',L',D')=RU(L'',D'',\rho,1/\sigma^2) \quad (21)$$

To summarize, processor 150 may compute a special triangular matrix K and an updated square root matrix M', triangular matrix L', and diagonal matrix D' based on current versions of L, D, α, and e. Further, processor 150 may accommodate changing numbers of sample sets using the square root matrix M instead of the covariance matrix R. The inherent mathematical properties of M, L, D, and K enables processor 150 to update M using simpler procedures than typically associated with updating R. Processor 150 may then use M' in place of M to process the received signals. As a result, using M instead of R significantly reduces the complexity of both the updating and processing operations implemented by processor 150.

Figure 2:
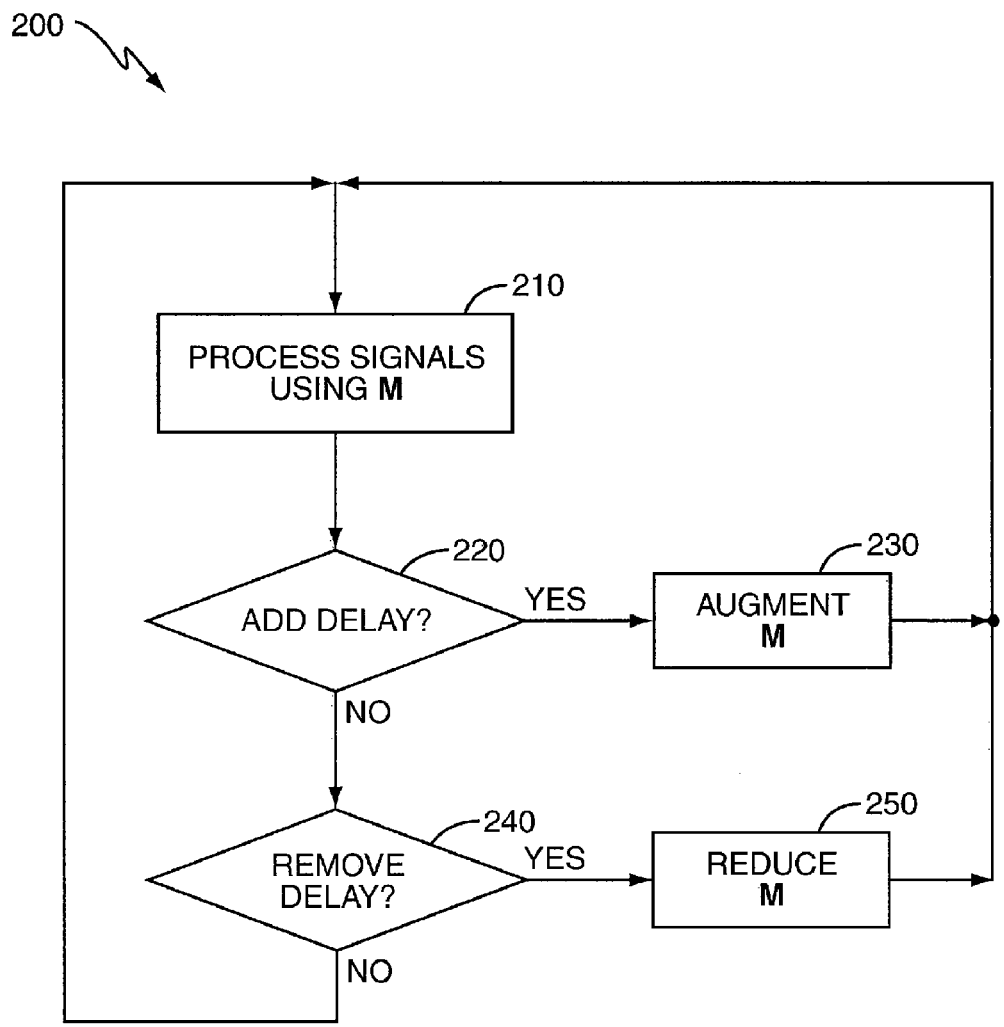
FIG. 2 shows a flow chart for one exemplary update process according to the present invention.

FIG. 2 generally illustrates one exemplary process 200 for updating the square root matrix M based on a changing number of sample sets. GRAKE receiver 110 processes the received signal r(t) using M as described above (block 210). When a new sample set with a new delay appears in the received signal (block 220), processor 150 augments M (block 230) to account for the new RAKE finger 120. GRAKE receiver 110 then replaces the previous square root matrix M with the augmented updated square root matrix M' for future processing of the received signal r(t) (block 210). When a sample set is no longer present in the received signal (block 240), processor 150 reduces M (block 250) to account for the removed RAKE finger 120. GRAKE receiver 110 then replaces the previous square root matrix M with the reduced updated square root matrix M' for future processing of the received signal r(t) (block 210).

Figure 3:
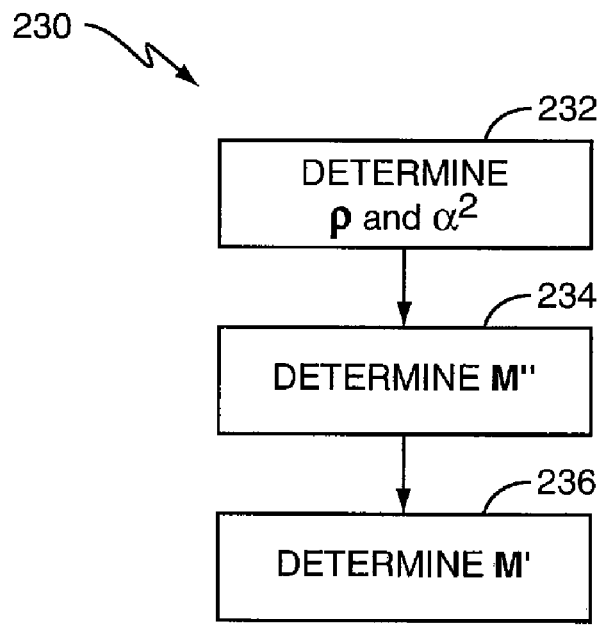
FIG. 3 shows an exemplary flow chart for augmenting the covariance matrix.

FIG. 3 illustrates specific details of one exemplary augmenting process (block 230) for FIG. 2. To augment the square root matrix M, processor 150 determines impairment correlations ρ and a noise power $\sigma^2$ for the added sample set (block 232). The impairment correlations ρ represent cross correlations between the values in the added sample set and the values in the existing sample sets. Based on the determined impairment correlations ρ and the noise power $\sigma^2$, processor 150 compensates the current square root matrix M to generate a compensated square root matrix M" (block 234). Processor 150 then augments the compensated square root matrix M" to generate the augmented updated square root matrix M' by adding a column and a row to the compensated square root matrix M" according to Equation (19) (block 236). The added column and row have a diagonal element derived from the noise power $\sigma^2$ and off-diagonal elements derived from the impairment correlations ρ.

Figure 4:
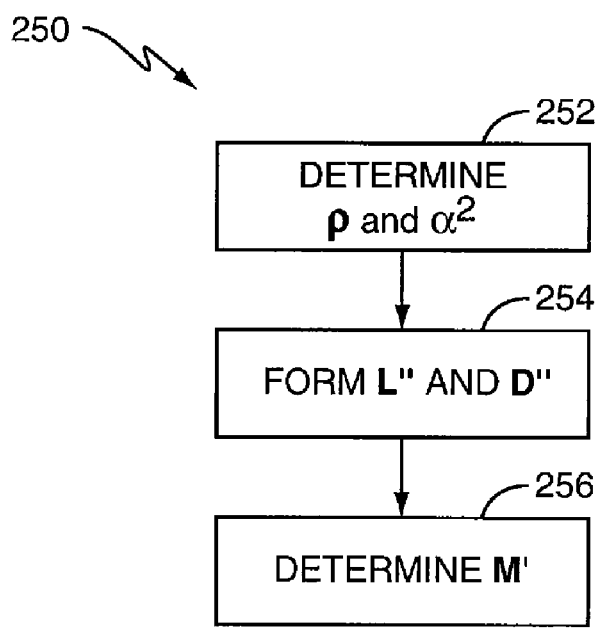
FIG. 4 shows an exemplary flow chart for reducing the covariance matrix.

FIG. 4 shows specific details of one exemplary reducing process (block 250) for FIG. 2. To reduce the square root matrix M, processor 150 determines impairment correlations ρ and a noise power $\sigma^2$ for the removed sample set (block 252). The impairment correlations ρ represent cross correlations between the values in the removed sample set and the values in the remaining sample sets. Processor 150 then removes the row and column corresponding to the removed sample set from the triangular matrix L and the diagonal matrix D to form a reduced triangular matrix L″ and a reduced diagonal matrix D″, respectively (block 254). Based on the reduced triangular matrix L″, the reduced diagonal matrix D″, the impairment correlations ρ, and the noise power σ², processor 150 computes the reduced square root matrix M′ according to Equation (21) (block 256).

The above describes updating procedures for a square root matrix M based on changing channel conditions and/or a changing number of sample sets or fingers available to the receiver. It will be appreciated that each time the square root matrix M is updated, the updated version replaces the previous version and is used for future processing and update operations.

The above-described updating procedures for square root matrix M assume that either the covariance matrix R or the square root matrix M already exists and/or has been initialized. However, this assumption may not always be true. The following describes multiple processes for initializing the square root matrix M.

In one embodiment, M is initialized using an iterative process starting with a square root matrix M set to a multiple of the identity matrix at time t=0, and ending with the initialized square root matrix M at time t=T. According to this "identity start" embodiment, the covariance matrix R is first set to some multiple ε of the identity matrix, as shown in Equation (22).

$$R(t=0) = \epsilon I \qquad (22)$$

As a result, the initial covariance matrix is non-singular. Based on Equation (22) and Equations (5)-(7), the square root matrix M, triangular matrix L, and diagonal matrix D at time t=0 are given by:

$$M(t=0) = \varepsilon^{1/2} I \qquad (23)$$
$$L(t=0) = I$$
$$D(t=0) = \varepsilon I.$$

To determine the initial square root matrix M at a later time t=T, processor 150 implements the following iterative steps:

$$\text{for } t = 1{:}T$$
$$[M(t),L(t),D(t)] = RU(L(t-1),D(t-1),e(t),\alpha) \qquad (24)$$
$$\text{end,}$$

where RU(●) represents the update process shown by Equations (12)-(16). Processor 150 uses the resulting initialized square root matrix M in the subsequent processing and updating operations discussed above.

Alternate initialization embodiments are based on the assumption that the covariance matrix R is first set to an n×n zero matrix (R(t=0)=[0]). Because the zero covariance matrix R is of size n, it takes n updates to generate a full rank covariance matrix R. That is, to generate a full-rank covariance matrix R of rank-n, processor 150 updates the covariance matrix according to Equation (4) n times. The following describes two alternate embodiments for initializing the square root matrix M when R is initialized using this "zero start" process.

In one embodiment, referred to herein as the hybrid procedure, processor 150 defines the covariance matrix generated by the nth update as the initial covariance matrix R(t=n).

Subsequently, processor 150 generates the initial square root matrix M according to Equations (5)-(7) using the full-rank initialized covariance matrix R(t=n). Processor 150 uses the resulting initialized square root matrix M in the subsequent processing and updating operations discussed above. According to the hybrid procedure, processor 150 first determines a rank-n covariance matrix R using the zero start process described above. Subsequently, processor 150 uses Cholesky decomposition to determine the corresponding rank-n L, D, and M matrices. Processor 150 then uses the rank-n L, D, and M matrices to implement the square root update procedure associated with the identity start process from time t=n+1 to some desired time t=T, as shown by:

$$\text{for } t = n+1{:}T$$
$$[M(t),L(t),D(t)] = RU(L(t-1),D(t-1),e(t),\alpha) \qquad (25)$$
$$\text{end.}$$

Processor 150 uses the resulting initialized square root matrix M in the subsequent processing and updating operations discussed above.

In another hybrid embodiment, referred to herein as the modified hybrid procedure, processor 150 defines a new square root matrix M and a new updated square root matrix M′ for the first n iterations, taking into account the particular structure of the covariance matrix R in each iteration. For example, for the first iteration the covariance matrix R is a rank-1 matrix defined by $R(1)=\alpha e(1)e(1)^H$. For this covariance matrix R(1), the triangular matrix L(1), the diagonal matrix D(1), and the corresponding square root matrix M(1) of the first iteration may be defined by:

$$L(1) = \begin{bmatrix} 1 & & & \\ e_2/e_1 & 1 & & \\ \vdots & & \ddots & \\ e_n/e_1 & \cdots & e_n/e_{n-1} & 1 \end{bmatrix} \qquad (26)$$

$$D(1) = \begin{bmatrix} \alpha|e_1|^2 & & & \\ & 0 & & \\ \vdots & & \ddots & \\ & & & 0 \end{bmatrix} \qquad (27)$$

$$M(1) = L(1)D(1)^{1/2} = \sqrt{\alpha}\,\frac{e_1^*}{|e_1|}\begin{bmatrix} e_1 & & & \\ e_2 & 0 & & \\ \vdots & \vdots & \ddots & \\ e_n & 0 & \cdots & 0 \end{bmatrix} \qquad (28)$$

As seen by the above equations, L(1) is a rank-n matrix, even though M(1) is a rank-1 matrix. This enables processor 150 to use L(1) in the update process that generates the next iteration of the square root matrix, M(2). Generally speaking, each triangular matrix L(t) will be a rank-n matrix due to the 1's in the diagonal. This guarantees the invertibility of L, which is necessary for computing the square root update, as shown by Equation (14). Further, each diagonal matrix D(t) will have 0's in the last n-t diagonal elements, giving it and the square root matrix M(t) rank t. The following provides specific details for generating each update for M for this exemplary initialization process.

For the $t^{th}$ iteration, processor 150 computes the first t diagonal elements $d_i'$ of updated diagonal matrix D′ according to:

$$\begin{aligned}&\gamma_1 = 1/\alpha\\&\text{for } i = 1:t\\&\quad a = \gamma_i d_i + |p_i|^2\\&\quad \gamma_i + 1 = a/d_i\\&\quad d_i' = a/\gamma_i\\&\quad \beta_i = p_i/a\\&\text{end}\end{aligned} \quad (29)$$

As discussed above, the remaining diagonal elements are zero by construction. Processor 150 uses the results to construct a new special diagonal matrix K, modified from the one defined in Equation (13) by setting the lower right entries beyond the $t^{th}$ entries to 0, as shown by Equation (30).

$$K = \begin{bmatrix} 1 & & & & & & & & \\ p_2\beta_1^* & 1 & & & & & & & \\ p_3\beta_1^* & p_3\beta_2^* & 1 & & & & & & \\ \vdots & \vdots & \vdots & \ddots & & & & & \\ p_{t+1}\beta_1^* & p_{t+1}\beta_2^* & \cdots & p_{t+1}\beta_t^* & 1 & & & & \\ p_{t+2}\beta_1^* & p_{t+2}\beta_2^* & \cdots & p_{t+2}\beta_t^* & 0 & 1 & & & \\ \vdots & \vdots & & \vdots & \vdots & \ddots & \ddots & \\ p_n\beta_1^* & p_n\beta_2^* & \cdots & p_n\beta_t^* & 0 & \cdots & 0 & 1 \end{bmatrix} \quad (30)$$

Lastly, processor 150 computes updated triangular matrix L' from Equation (12), and updated square root matrix M' from Equation (16). To summarize, processor 150 generates the initialized square root matrix M at time t=T according to:

$$\begin{aligned}&L(1) \text{ from Equation 25}\\&D(1) \text{ from Equation 26}\\&M(1) \text{ from Equation 27}\\&\text{for } t = 2:n\\&\quad [M(t),L(t),D(t)] = RUS(L(t-1),D(t-1),e(t),\alpha,t)]\\&\text{end}\\&\text{for } t = n+1:T\\&\quad [M(t),L(t),D(t)] = RU(L(t-1),D(t-1),e(t),\alpha)]\\&\text{end,}\end{aligned} \quad (31)$$

where RU(●) represents the update process shown by Equations (12)-(16), and RUS(●) represents the update process produced by Equations (12), (14), (16), (29), and (30) for singular matrices. Processor 150 uses the resulting initialized square root matrix M in the subsequent processing and updating operations discussed above.

Figure 5:
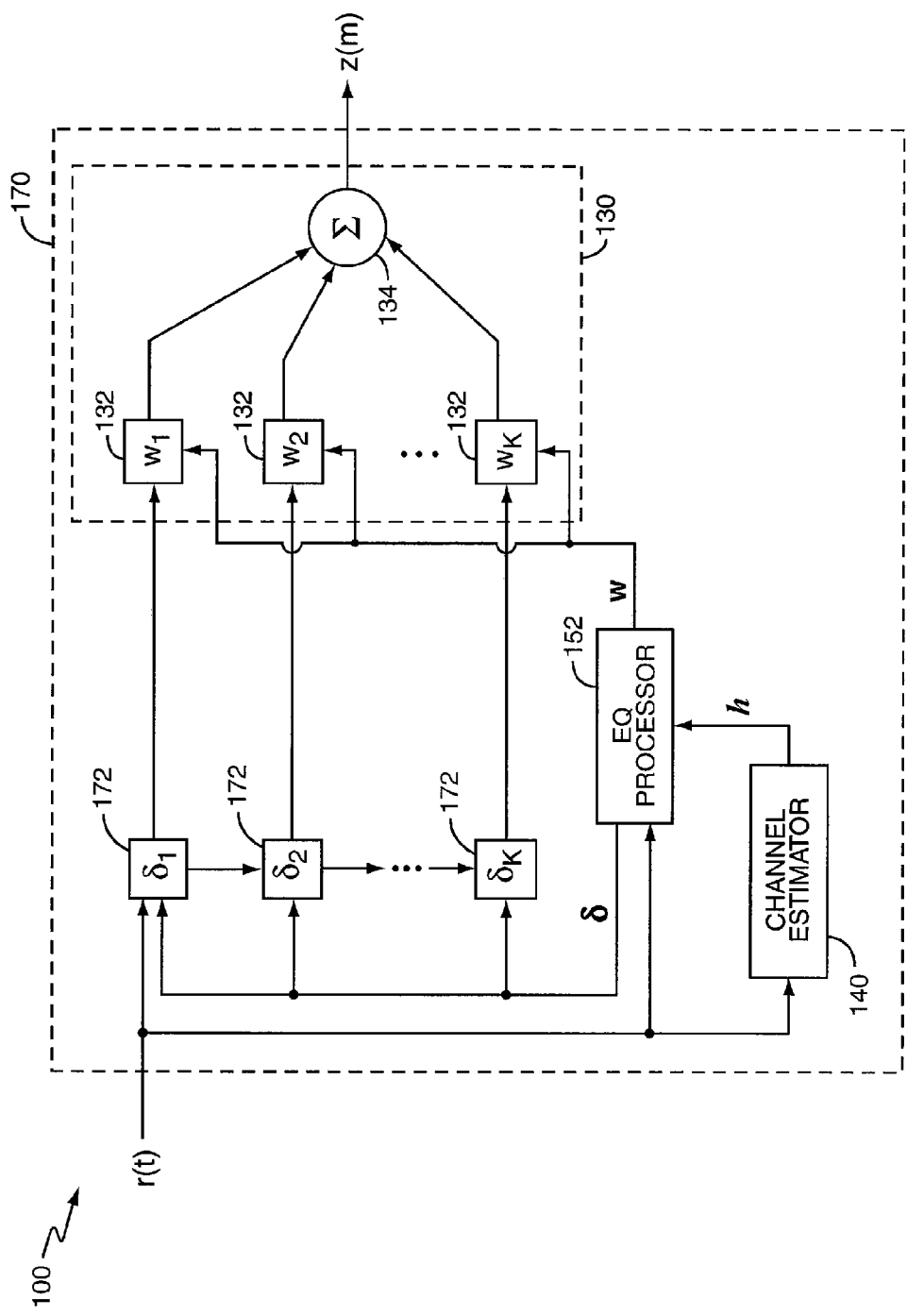
FIG. 5 shows a block diagram of one exemplary wireless receiver comprising a chip equalizer.

While the above describes the present invention in terms of a GRAKE receiver 110, those skilled in the art will appreciate that the present invention also applies to other types of receivers, including chip equalizers. FIG. 5 shows an exemplary chip equalizer 170. In addition to the combiner 130 and channel estimator 140, chip equalizer 170 includes an equalizer processor 152 and a plurality of successive delay elements 172. Equalizer processor 152 computes a square root matrix M, a plurality of delays δ, and a plurality of weighting factors w based on the received signal r(t) and the channel estimates h. Delay elements 172 successively delay the received signal r(t) according to the computed delays δ. Weighting elements 132 in combiner 130 weight the successively delayed samples according to the computed weighting factors w. Summer 134 combines the weighted samples to produce the estimated output sample z(m). When a sample set, i.e., a delay element output, is added or removed from the received signal, equalizer processor 152 augments or reduces, respectively, the square root matrix M, as discussed above.

While not explicitly shown, the present invention also applies to other receivers that process time-aligned signals and/or sample sets corresponding to a transmitted signal. Regardless of the type of receiver, the present invention augments/reduces a square root matrix M corresponding to a covariance matrix R particular to the receiver to account for added/removed delayed sample sets and/or signals. Exemplary receivers include RAKE receivers having a sample set for each RAKE finger, multi-user detection receivers having at least one sample set for each user, multiple input/multiple output (MIMO) receivers having a sample set for each input/output, etc. For example, consider a MIMO system having J transmit antennas and K receive antennas. On the receiving end, the MIMO system comprises J sub-receivers, one for each of the J transmit antennas. Each of the J sub-receivers is a duplicate of the above-described receiver, and each sub-receiver is connected to the K receive antennas that receive the signals transmitted by the J transmit antennas. The $j^{th}$ sub-receiver is dedicated to processing the signal transmitted by the $j^{th}$ remote antenna and received by all K receive antennas. This $j^{th}$ sub-receiver computes the path delays, channel estimates, etc., using the procedure associated with signals transmitted by a single antenna. As shown in Equation (4), the covariance matrix R captures the effect of the other J−1 transmitted signals on the reception of the $j^{th}$ signal via the error vector e.

The above-described wireless receiver 100 may be embodied in any wireless device, such as a base station or a mobile terminal. As used herein, the term "mobile terminal" includes a cellular radiotelephone and any wireless device that includes a radiotelephone transceiver. Mobile terminals may also be referred to as "pervasive computing" devices.

The present invention also applies to other signal processing devices that utilize a noise covariance matrix. These devices include wireline receivers, where received signals are subjected to extensive channel dispersion and typically require some form of equalization. These devices also include acoustic receivers that process data from multiple microphones. In this case, the acoustic processing may benefit from knowledge about the noise covariance among sensors. The above examples are intended to be illustrative and therefore are not limiting.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of processing a signal received by a wireless receiver, the method comprising:
   sampling the received signal to generate a plurality of sample sets;
   generating a square root matrix of a covariance matrix representing cross correlations between the plurality of sample sets;
   determining impairment correlations and a noise power for an added sample set;
   compensating the square root matrix based on the impairment correlations and the noise power to generate a compensated square root matrix; and
   augmenting the compensated square root matrix by adding a column and a row having a diagonal element derived from the noise power and off-diagonal elements derived from the impairment correlations to generate an augmented square root matrix.

2. The method of claim 1 wherein compensating the square root matrix based on the impairment correlations and the noise power further comprises compensating the square root matrix based on a triangular matrix and a diagonal matrix corresponding to the covariance matrix.

3. The method of claim 1 wherein augmenting the compensated square root matrix by adding a column and a row having a diagonal element derived from the noise power and off-diagonal elements derived from the impairment correlations comprises deriving a value of the diagonal element based on a standard deviation of the noise power.

4. The method of claim 1 wherein augmenting the compensated square root matrix by adding a column and a row having a diagonal element derived from the noise power and off-diagonal elements derived from the impairment correlations comprises deriving the off-diagonal elements based on the impairment correlations scaled as a function of a standard deviation of the noise power.

5. The method of claim 1 wherein the wireless receiver comprises a RAKE or GRAKE receiver, wherein the plurality of sample sets comprise a plurality of sample sets having values from a plurality of fingers of the RAKE or GRAKE receiver, and wherein the added sample set comprises sample values from an added finger for the RAKE or the GRAKE receiver.

6. The method of claim 1 wherein the wireless receiver comprises a chip equalizer, wherein the plurality of sample sets comprise a plurality of sample sets having values from a plurality of tap delay outputs of the chip equalizer, and wherein the added sample set comprises sample values from an added tap output for the chip equalizer.

7. The method of claim 1 wherein the wireless receiver comprises a multi-signal receiver, wherein the plurality of sample sets comprise sample sets having values from the multi-signal receiver, and wherein the added sample set comprises sample values from an added input signal for the multi-signal receiver.

8. The method of claim 1 further comprising processing a new plurality of sample sets, including the added sample set, based on the augmented square root matrix.

9. The method of claim 1 further comprising initializing the square root matrix before compensating the square root matrix.

10. The method of claim 9 wherein initializing the square root matrix comprises:
setting a first covariance matrix equal to a zero matrix;
iteratively updating the first covariance matrix n times based on n sequentially generated sets of channel estimates to generate a rank-n covariance matrix;
determining the square root of the rank-n covariance matrix to generate a first square root matrix; and
iteratively updating the first square root matrix based on iteratively updated channel estimates to generate an initial square root matrix.

11. The method of claim 9 wherein initializing the square root matrix comprises:
defining a rank-one covariance matrix;
determining a first square root matrix based on the rank-one covariance matrix;
iteratively updating the first covariance matrix n times based on a singular matrix update process to generate a rank-n square root matrix; and iteratively updating the rank-n square root matrix based on a non-singular matrix update process to generate an initial square root matrix.

12. A method of processing a signal received by a wireless receiver, the method comprising:
sampling the received signal to generate a plurality of sample sets;
generating a square root matrix of a covariance matrix representing cross correlations between the plurality of sample sets;
determining impairment correlations and a noise power for a removed sample set removed from the plurality of sample sets;
removing a row and a column corresponding to the removed sample set from both a triangular matrix and a diagonal matrix corresponding to the covariance matrix, to thereby obtain reduced triangular and diagonal matrices; and
computing a reduced square root matrix based on the reduced triangular matrix, the reduced diagonal matrix, the impairment correlations, and the noise power.

13. The method of claim 12 wherein the wireless receiver comprises a RAKE or GRAKE wireless receiver, wherein the plurality of sample sets comprise a plurality of sample sets having values from a plurality of fingers of the RAKE or GRAKE receiver, and wherein the removed sample set comprises sample values from a de-allocated finger for the RAKE or the GRAKE receiver.

14. The method of claim 12 wherein the wireless receiver comprises a chip equalizer, wherein the plurality of sample sets comprise a plurality of sample sets having values from tap delay outputs of the chip equalizer, and wherein the removed sample set comprises sample values from a de-allocated tap delay output for the chip equalizer.

15. The method of claim 12 wherein the wireless receiver comprises a multi-signal receiver, wherein the plurality of sample sets comprise sample sets having values from the multi-signal receiver, and wherein the removed sample set comprises sample values from an input signal no longer of interest for the multi-signal receiver.

16. The method of claim 12 further comprising processing a new plurality of sample sets, said new plurality of sample sets excluding the removed sample set, based on the reduced square root matrix.

17. The method of claim 12 further comprising initializing the square root matrix before reducing the square root matrix.

18. The method of claim 17 wherein initializing the square root matrix comprises:
setting a first covariance matrix equal to a zero matrix;
iteratively updating the first covariance matrix n times based on n sequentially generated sets of channel estimates to generate a rank-n covariance matrix;
determining the square root of the rank-n covariance matrix to generate a first square root matrix; and
iteratively updating the first square root matrix based on iteratively updated channel estimates to generate an initial square root matrix.

19. The method of claim 17 wherein initializing the square root matrix comprises:
defining a rank-one covariance matrix;
determining a first square root matrix based on the rank-one covariance matrix;
iteratively updating the first covariance matrix n times based on a singular matrix update process to generate a rank-n square root matrix; and iteratively updating the rank-n square root matrix based on a non-singular matrix update process to generate an initial square root matrix.

20. A processor in a wireless receiver, said processor configured to:
- sample a received signal to generate a plurality of sample sets;
- generate a square root matrix of a covariance matrix representing cross correlations between the plurality of sample sets;
- determine impairment correlations and a noise power for an added sample set;
- compensate the square root matrix based on the impairment correlations and the noise power to generate a compensated square root matrix; and
- augment the compensated square root matrix by adding a column and a row having a diagonal element derived from the noise power and off-diagonal elements derived from the impairment correlations to generate an augmented square root matrix.

21. A GRAKE receiver including the processor of claim 20, wherein the plurality of sample sets comprise values from a plurality of RAKE fingers, and wherein the added sample set comprises sample values from an added RAKE finger.

22. A chip equalizer including the processor of claim 20, wherein the plurality of sample sets comprise a plurality of sample sets having values from a plurality of tap delay outputs of the chip equalizer, and wherein the added sample set comprises sample values from an added tap delay.

23. A multi-signal receiver including the processor of claim 20, wherein the plurality of sample sets comprise sample sets having values from the multi-signal receiver, and wherein the added sample set corresponds to an added input signal for the multi-signal receiver.

24. A processor in a wireless receiver, said processor configured to:
- sample a received signal to generate a plurality of sample sets;
- generate a square root matrix of a covariance matrix representing cross correlations between the plurality of sample sets;
- determine impairment correlations and a noise power for a removed sample set;
- remove a row and a column corresponding to the removed sample set from a triangular matrix and a diagonal matrix corresponding to the covariance matrix, to thereby obtain a reduced triangular matrix and a reduced diagonal matrix; and
- compute a reduced square root matrix based on the reduced triangular matrix, the reduced diagonal matrix, the impairment correlations, and the noise power.

25. A GRAKE receiver including the processor of claim 24, wherein the plurality of sample sets comprise values from a plurality of RAKE fingers, and wherein the removed sample set comprises sample values from a de-allocated RAKE finger.

26. A chip equalizer including the processor of claim 24, wherein the plurality of sample sets comprise a plurality of sample sets having values from a plurality of tap delay outputs of the chip equalizer, and wherein the removed sample set comprises sample values from a de-allocated tap delay.

27. A multi-signal receiver including the processor of claim 24, wherein the plurality of sample sets comprise sample sets having values from the multi-signal receiver, and wherein the removed sample set corresponds to an input signal no longer of interest to the multi-signal receiver.

* * * * *

UNITED STATES PATENT AND TRADEMARK OFFICE
CERTIFICATE OF CORRECTION

| | | |
|---|---|---|
| PATENT NO. | : 7,769,080 B2 | Page 1 of 1 |
| APPLICATION NO. | : 11/470676 | |
| DATED | : August 3, 2010 | |
| INVENTOR(S) | : Khayrallah | |

It is certified that error appears in the above-identified patent and that said Letters Patent is hereby corrected as shown below:

On the Title Page, item (74), under "Attorney, Agent, or Firm", in Column 1, Line 1, delete "Coates" and insert -- Coats --, therefor.

In Column 2, Line 28, delete "1 00" and insert -- 100 --, therefor.

In Column 7, Line 67, delete "nth" and insert -- $n^{th}$ --, therefor.

In Column 8, Line 62, delete "t" and insert -- t. --, therefor.

Signed and Sealed this
Twenty-second Day of February, 2011

David J. Kappos
*Director of the United States Patent and Trademark Office*